(12) United States Patent
Lin et al.

(10) Patent No.: US 9,692,695 B2
(45) Date of Patent: Jun. 27, 2017

(54) TECHNIQUES FOR AGGREGATING HARDWARE ROUTING RESOURCES IN A MULTI-PACKET PROCESSOR NETWORKING SYSTEM

(71) Applicant: BROCADE COMMUNICATIONS SYSTEMS, INC., San Jose, CA (US)

(72) Inventors: Kwun-Nan Kevin Lin, Saratoga, CA (US); Vishal Sinha, Union City, CA (US); Gefan Zhang, San Jose, CA (US); Kalpesh Bafna, Milpitas, CA (US); Siddhesh Dindorkar, San Jose, CA (US); Tao Guan, Cupertino, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 311 days.

(21) Appl. No.: 14/506,943

(22) Filed: Oct. 6, 2014

(65) Prior Publication Data

US 2015/0281055 A1 Oct. 1, 2015

Related U.S. Application Data

(60) Provisional application No. 61/971,429, filed on Mar. 27, 2014.

(51) Int. Cl.
*H04L 12/28* (2006.01)
*H04L 12/771* (2013.01)
*H04L 12/745* (2013.01)
*H04L 12/741* (2013.01)
*H04L 12/733* (2013.01)

(52) U.S. Cl.
CPC .......... *H04L 45/563* (2013.01); *H04L 45/745* (2013.01); *H04L 45/748* (2013.01); *H04L 45/20* (2013.01)

(58) Field of Classification Search
CPC ....................................................... H04L 45/00
USPC ......................................................... 370/389
See application file for complete search history.

(56) References Cited

U.S. PATENT DOCUMENTS

| 4,625,308 | A | 11/1986 | Kim et al. |
| 5,481,073 | A | 1/1996 | Singer et al. |
| 5,651,003 | A | 7/1997 | Pearce et al. |
| 6,111,672 | A | 8/2000 | Davis et al. |

(Continued)

FOREIGN PATENT DOCUMENTS

WO 2015026950 A1 2/2015

OTHER PUBLICATIONS

Extended European Search Report dated Jul. 30, 2015 for EP Appln. 15000834.0; 8 pages.

(Continued)

*Primary Examiner* — Christopher R Crompton
(74) *Attorney, Agent, or Firm* — Fountainhead Law Group P.C.

(57) ABSTRACT

Techniques for aggregating hardware routing resources in a system of devices are provided. In one embodiment, a device in the system of devices can divide routing entries in a software routing table of the system into a plurality of route subsets. The device can further assign each route subset in the plurality of route subsets to one or more devices in the system. The device can then install, for each route subset that is assigned to the device, routing entries in the route subset into a hardware routing table of the device.

19 Claims, 13 Drawing Sheets

(56) References Cited

U.S. PATENT DOCUMENTS

| | | |
|---|---|---|
| 6,243,756 B1 | 6/2001 | Whitmire et al. |
| 6,366,582 B1 | 4/2002 | Nishikado et al. |
| 6,373,840 B1 | 4/2002 | Chen |
| 6,490,276 B1 | 12/2002 | Salett et al. |
| 6,496,502 B1 | 12/2002 | Fite, Jr. et al. |
| 6,516,345 B1 | 2/2003 | Kracht |
| 6,526,345 B2 | 2/2003 | Ryoo |
| 6,597,658 B1 | 7/2003 | Simmons |
| 6,725,326 B1 | 4/2004 | Patra et al. |
| 6,765,877 B1 | 7/2004 | Foschiano et al. |
| 6,807,182 B1 | 10/2004 | Dolphin et al. |
| 6,839,342 B1 | 1/2005 | Parham et al. |
| 6,839,349 B2 | 1/2005 | Ambe et al. |
| 6,850,542 B2 | 2/2005 | Tzeng |
| 7,093,027 B1 | 8/2006 | Shabtay et al. |
| 7,099,315 B2 | 8/2006 | Ambe et al. |
| 7,106,736 B2 | 9/2006 | Kalkunte |
| 7,136,289 B2 | 11/2006 | Vasavda et al. |
| 7,184,441 B1 | 2/2007 | Kadambi et al. |
| 7,206,283 B2 | 4/2007 | Chang et al. |
| 7,206,309 B2 | 4/2007 | Pegrum et al. |
| 7,274,694 B1 | 9/2007 | Cheng et al. |
| 7,313,667 B1 | 12/2007 | Pullela et al. |
| 7,327,727 B2 | 2/2008 | Rich et al. |
| 7,336,622 B1 | 2/2008 | Fallis et al. |
| 7,426,179 B1 | 9/2008 | Harshavardhana et al. |
| 7,480,258 B1 | 1/2009 | Shuen et al. |
| 7,496,096 B1 | 2/2009 | Dong et al. |
| 7,523,227 B1 | 4/2009 | Yager et al. |
| 7,565,343 B2 | 7/2009 | Watanabe |
| 7,602,787 B2 | 10/2009 | Cheriton |
| 7,697,419 B1 | 4/2010 | Donthi |
| 7,933,282 B1 | 4/2011 | Gupta et al. |
| 8,209,457 B2 | 6/2012 | Engel et al. |
| 8,307,153 B2 | 11/2012 | Kishore |
| 8,750,144 B1 | 6/2014 | Zhou et al. |
| 8,949,574 B2 | 2/2015 | Slavin |
| 9,032,057 B2 | 5/2015 | Agarwal et al. |
| 9,038,151 B1 | 5/2015 | Chua et al. |
| 9,148,387 B2 | 9/2015 | Lin et al. |
| 9,185,049 B2 | 11/2015 | Agarwal et al. |
| 9,269,439 B1 | 2/2016 | Levy et al. |
| 9,282,058 B2 | 3/2016 | Lin et al. |
| 9,313,102 B2 | 4/2016 | Lin et al. |
| 9,559,897 B2 | 1/2017 | Lin et al. |
| 9,577,932 B2 | 2/2017 | Ravipati et al. |
| 2001/0042062 A1 | 11/2001 | Tenev et al. |
| 2002/0046271 A1 | 4/2002 | Huang |
| 2002/0101867 A1 | 8/2002 | O'Callaghan et al. |
| 2003/0005149 A1 | 1/2003 | Haas et al. |
| 2003/0169734 A1 | 9/2003 | Lu et al. |
| 2003/0174719 A1 | 9/2003 | Sampath et al. |
| 2003/0188065 A1 | 10/2003 | Golla et al. |
| 2005/0063354 A1 | 3/2005 | Garnett et al. |
| 2005/0141513 A1 | 6/2005 | Oh et al. |
| 2005/0198453 A1 | 9/2005 | Osaki |
| 2005/0243739 A1 | 11/2005 | Anderson et al. |
| 2005/0271044 A1 | 12/2005 | Hsu et al. |
| 2006/0013212 A1 | 1/2006 | Singh et al. |
| 2006/0023640 A1 | 2/2006 | Chang et al. |
| 2006/0072571 A1 | 4/2006 | Navada et al. |
| 2006/0077910 A1 | 4/2006 | Lundin et al. |
| 2006/0080498 A1 | 4/2006 | Shoham et al. |
| 2006/0092849 A1 | 5/2006 | Santoso et al. |
| 2006/0092853 A1 | 5/2006 | Santoso et al. |
| 2006/0176721 A1 | 8/2006 | Kim et al. |
| 2006/0187900 A1 | 8/2006 | Akbar |
| 2006/0253557 A1 | 11/2006 | Talayco et al. |
| 2006/0280125 A1 | 12/2006 | Ramanan et al. |
| 2006/0294297 A1 | 12/2006 | Gupta |
| 2007/0081463 A1 | 4/2007 | Bohra et al. |
| 2007/0121673 A1 | 5/2007 | Hammer |
| 2007/0174537 A1 | 7/2007 | Kao et al. |
| 2008/0137530 A1 | 6/2008 | Fallis et al. |
| 2008/0192754 A1 | 8/2008 | Ku et al. |
| 2008/0259555 A1 | 10/2008 | Bechtolsheim et al. |
| 2008/0275975 A1 | 11/2008 | Pandey et al. |
| 2008/0281947 A1 | 11/2008 | Kumar |
| 2009/0125617 A1 | 5/2009 | Klessig et al. |
| 2009/0135715 A1 | 5/2009 | Bennah |
| 2009/0141641 A1 | 6/2009 | Akahane et al. |
| 2010/0172365 A1 | 7/2010 | Baird et al. |
| 2010/0182933 A1 | 7/2010 | Hu et al. |
| 2010/0185893 A1 | 7/2010 | Wang et al. |
| 2010/0257283 A1 | 10/2010 | Agarwal |
| 2010/0284414 A1 | 11/2010 | Agarwal et al. |
| 2010/0293200 A1 | 11/2010 | Assarpour |
| 2010/0329111 A1 | 12/2010 | Wan et al. |
| 2011/0238923 A1 | 9/2011 | Hooker et al. |
| 2011/0268123 A1 | 11/2011 | Kopelman et al. |
| 2012/0020373 A1 | 1/2012 | Subramanian et al. |
| 2012/0087232 A1 | 4/2012 | Hanabe et al. |
| 2012/0155485 A1 | 6/2012 | Saha et al. |
| 2012/0246400 A1 | 9/2012 | Bhadra et al. |
| 2013/0170495 A1 | 7/2013 | Suzuki et al. |
| 2013/0201984 A1 | 8/2013 | Wang |
| 2013/0215791 A1 | 8/2013 | Lin et al. |
| 2013/0232193 A1 | 9/2013 | Ali et al. |
| 2013/0262377 A1 | 10/2013 | Agarwal |
| 2014/0003228 A1 | 1/2014 | Shah et al. |
| 2014/0006706 A1 | 1/2014 | Wang |
| 2014/0071985 A1 | 3/2014 | Kompella et al. |
| 2014/0075108 A1 | 3/2014 | Dong et al. |
| 2014/0112190 A1 | 4/2014 | Chou et al. |
| 2014/0112192 A1 | 4/2014 | Chou et al. |
| 2014/0122791 A1 | 5/2014 | Fingerhut |
| 2014/0126354 A1 | 5/2014 | Hui et al. |
| 2014/0153573 A1* | 6/2014 | Ramesh ............... H04L 45/748 370/392 |
| 2014/0181275 A1 | 6/2014 | Lin et al. |
| 2014/0269402 A1 | 9/2014 | Vasseur et al. |
| 2014/0314082 A1 | 10/2014 | Korpinen et al. |
| 2014/0334494 A1 | 11/2014 | Lin et al. |
| 2014/0341079 A1 | 11/2014 | Lin et al. |
| 2014/0341080 A1 | 11/2014 | Lin et al. |
| 2014/0376361 A1 | 12/2014 | Hui et al. |
| 2015/0016277 A1 | 1/2015 | Smith et al. |
| 2015/0036479 A1 | 2/2015 | Gopalarathnam |
| 2015/0055452 A1 | 2/2015 | Lee |
| 2015/0117263 A1 | 4/2015 | Agarwal et al. |
| 2015/0124826 A1* | 5/2015 | Edsall ................ H04L 12/4633 370/392 |
| 2015/0229565 A1 | 8/2015 | Ravipati et al. |
| 2015/0288567 A1 | 10/2015 | Lin et al. |
| 2016/0028652 A1 | 1/2016 | Agarwal et al. |
| 2016/0173332 A1 | 6/2016 | Agarwal et al. |
| 2016/0173339 A1 | 6/2016 | Lin et al. |

OTHER PUBLICATIONS

Pei et al.: "Putting Routing Tables in Silicon", IEEE Network, IEEE Service Center, New York, NY; vol. 6, No. 1, Jan. 1, 1992; pp. 42-50.

Hsiao et al.: "A High-Throughput and High-Capacity IPv6 Routing Lookup System", Computer Networks, Elsevier Science Publishers B.V., Amsterdam, NL, vol. 57, No. 3, Nov. 16, 2012, pp. 782-794.

BROCADE: "FastIron Ethernet Switch"; Administration Guide; Supporting FastIron Software Release 08.0.00; Apr. 30, 2013; 400 pages.

BROCADE: "FastIron Ethernet Switch"; IP Multicast Configuration Guide; Supporting FastIron Software Release 08.0.00; Apr. 30, 2013; 212 pages.

BROCADE: "FastIron Ethernet Switch"; Stacking Configuration Guide; Supporting FastIron Software Release 08.0.00; Apr. 30, 2013; 170 pages.

BROCADE: "FastIron Ethernet Switch"; Traffic Management Guide; Supporting FastIron Software Release 08.0.00; Apr. 30, 2013; 76 pages.

Cisco: "Cisco StackWise and StackWise Plus Technology"; technical white paper; C11-377239-01; Oct. 2010; Copyright 2010; 11 pages.

(56) References Cited

OTHER PUBLICATIONS

Cisco: "Delivering High Availability in the Wiring Closet with Cisco Catalyst Switches"; technical white paper; C11-340384-01; Jan. 2007; Copyright 1992-2007; 8 pages.
Configure, Verify, and Debug Link Aggregation Control Program (LACP); allied Telesyn; 2004; 10 pages.
Dell: "Stacking Dell PowerConnect 7000 Series Switches"; A Dell Technical White Paper; Jul. 2011; 34 pages.
DLDP Techology White Paper; H3C products and solutions; 2008; 8 pages; http://www.h3c.com/portal/Products_Solutions/Technology/LAN/Technology_White_Paper/200812/623012_57_0.htm.
Extreme Networks Technical Brief: "SummitStack Stacking Technology"; 1346_06; Dec. 2010; 8 pages.
Fischer et al.: "A Scalable ATM Switching System Architecture"; IEEE Journal on Selected Areas in Communications, IEEE Service Center, Piscataway, US, vol. 9, No. 8, Oct. 1, 1991; pp. 1299-1307.
Understanding and Configuring the Undirectional Link Detection Protocol Feature; Cisco support communication; Jul. 9, 2007; Document ID No. 10591; 5 pages; http://www.cisco.com/c/en/us/support/docs/lan-switching/spanning-tree-protocol/10591-77.html.
Juniper Networks datasheet entitled: "Juniper Networks EX 4200 Ethernet Switches with Virtual Chassis Technology"; Dated Aug. 2013 (2120-04300) (12 p.).

International Search Report and Written Opinion for International Appln. No. PCT/US2013/076251 dated May 22, 2014, 11 pages.
Link Aggregation; http://en.wikipedia.org/wiki/Link_aggregation; downloaded from Internet on Dec. 16, 2013; 9 pages.
M. Foschiano; Cisco Systems UniDirectional Link Detection (UDLD) Protocol; Memo; Apr. 2008; 13 pages; Cisco Systems.
Migration from Cisco UDLD to industry standard DLDP; technical white paper; Feb. 2012; 12 pages; Hewlett-Packard Development Company.
Partial International Search Report for PCT/US2014/051903 dated Nov. 18, 2014.
Suckfuell: "Evolution of EWSD During the Eighties"; Institute of Electrical and Electronics Engineers; Global Telecommunications Conference; San Diego; Nov. 28-Dec. 1, 1983; [Global Telecommunications Conference], New York, IEEE, US, vol. 2, Nov. 1, 1983; pp. 577-581.
International Search Report and Written Opinion for International Appln. No. PCT/US2014/051903 dated Jan. 27, 2015, 16 pages.
Rooney et al.: "Associative Ternary Cache for IP Routing", IEEE, pp. 409-416, 2004.
"Starburst: Building Next-Generation Internet Devices", Sharp et al., Bell Labs Technical Journal, Lucent Technologies, Inc., pp. 6-17, 2002.

\* cited by examiner

TECHNIQUES FOR AGGREGATING HARDWARE ROUTING RESOURCES IN A MULTI-PACKET PROCESSOR NETWORKING SYSTEM

CROSS REFERENCES TO RELATED APPLICATIONS

The present application claims the benefit and priority under 35 U.S.C. 119(e) of U.S. Provisional Application No. 61/971,429, filed Mar. 27, 2014, entitled "TECHNIQUES FOR AGGREGATING HARDWARE RESOURCES IN A MULTI-PACKET PROCESSSOR NETWORKING SYSTEM." The entire contents of this provisional application are incorporated herein by reference for all purposes.

BACKGROUND

1. Layer 3 Routing

As known in the art, a router is a network device that interconnects multiple networks and forwards data packets between the networks (a process referred to as Layer 3, or L3, routing). To determine the best path to use in forwarding an ingress packet, a router examines the destination IP address of the packet and compares the destination IP address to routing entries in a routing table. Each routing entry corresponds to a subnet route (e.g., 192.168.2.0/24) or a host route (e.g., 192.168.2.129/32). If the destination IP address matches the subnet/host route of a particular routing entry, the router forwards the packet out of an egress port to a next hop address specified by the entry, thereby sending the packet towards its destination. In some cases, the destination IP address of an ingress packet may match multiple routing entries corresponding to multiple subnet/host routes. For example, the IP address 192.168.2.129 matches subnet routes 192.168.2.128/26 and 192.168.2.0/24, as well as host route 192.168.2.129/32. When this occurs, the router can perform its selection via longest prefix match (LPM), which means that the router will select the matched routing entry with the highest subnet mask (i.e., the most specific entry).

For performance reasons, many conventional routers perform the routing operations described above using a combination of software and hardware routing tables. For instance, FIG. 1 depicts an exemplary router 100 that includes a management CPU 102, a software (SW) routing table 104, and a packet processor 106 comprising a hardware (HW) routing engine 108, a HW routing table 110, and data ports 112. SW routing table 104 is implemented using a data structure that is stored in a random access memory accessible by management CPU 102 (not shown). Generally speaking, SW routing table 104 contains all of the subnet/host routes known to router 100, such as statically configured routes and routes that are dynamically learned from routing protocols (e.g., RIP, OSPF or BGP). On other hand, HW routing table 110 is implemented using a hardware-based memory component, such as a ternary content-addressable memory (TCAM) or other similar associative memory. Due to its specialized hardware design, HW routing table 110 can enable faster table lookups that SW routing table 104, but is limited in size. Thus, HW routing table 110 typically includes a subset of the routing entries in SW routing table 104.

When an ingress packet is received at router 100, HW routing engine 108 of packet processor 106 first looks for a LPM match for the packet's destination IP address in HW routing table 110. As mentioned above, HW routing engine 108 can perform this lookup very quickly (e.g., at line rate) because of table 110's hardware design. If a match is found, HW routing engine 108 forwards the packet to the next hop specified in the matched entry, without involving management CPU 102. If a match is not found, HW routing engine 108 takes a predefined action, such as dropping the packet or sending it to management CPU 102. If sent to management CPU 102, CPU 102 can perform additional inspection/processing to determine how the packet should be forwarded (such as performing a lookup in SW routing table 104).

2. Routing Tries

In certain implementations, router 100 maintains SW routing table 104 as a binary trie (referred to as a "routing trie"), which makes traversal and searching of SW routing table 104 more efficient. FIG. 2 depicts an exemplary routing trie 200 that may be used to represent SW routing table 104 of FIG. 1. As shown, routing trie 200 includes both branch nodes (denoted by the unmarked circles) and route nodes (denoted by the circles marked with "R"). Each branch node corresponds to a "fork" in routing trie 200, and thus forms the root of a sub-trie. Each route node corresponds to a routing entry in SW routing table 104. Further, each node (whether branch or route) is associated with an IP address prefix. There are generally two rules regarding how the nodes of a routing trie may be positioned:

1. Assume node 1 has prefix of mask1/m-bit, node 2 has a prefix of mask2/n-bit, and m>n. If mask2 is the same as the first n bits of mask1, node 1 is a descendent of node 2.
2. If the (n+1)-th bit of mask1 is 0, node 1 is at the left sub-trie of node 2. Otherwise, it is at the right sub-trie of node 2.

To illustrate the rules above, consider a routing table that includes two routing entries corresponding to two routes: 01001010/8 and 01010101/8 (represented in binary form). In this example, the routing trie for the table will contain three nodes: two route nodes (one for each of the two routes), and a root node that is a branch node associated with prefix 010/3 (because its two child nodes differ starting from the 4th bit). Note that if a new route 010/3 is added, the routing trie will still contain three nodes—the branch node associated with prefix 010/3 will become a route node.

3. Multi-Packet Processor Networking Systems

While router 100 of FIG. 1 is depicted as a standalone device with a single packet processor and a single HW routing table, some routers are implemented as a system of interconnected devices/modules, where each device/module incorporates a separate packet processor (with a separate HW routing table). Such systems are referred to herein as "multi-packet processor" (MPP) networking systems.

For example, FIG. 3 depicts a stacking system 300 (also known as a "stack"), which is one type of MPP networking system. As shown, stacking system 300 comprises a number of stackable switches 302(1)-302(3) that are interconnected via stacking ports 314(1)-314(3). Each stackable switch 302(1)-302(3) includes components that are similar to router 100 of FIG. 1, such as management CPU 304(1)-304(3), SW routing table 306(1)-306(3), packet processor 308(1)-308(3), HW routing engine 310(1)-310(3), HW routing table 312(1)-312(3), and data ports 316(1)-316(3). However, rather than acting as individual switches/routers, stackable switches 302(1)-302(3) of system 300 can act in concert as a single, logical switch/router. For instance, stackable switch 302(1) can receive a packet on an ingress data port 316(1), perform a lookup (via HW routing engine 310(1)) into its local HW routing table 312(1), and determine based on the lookup that the packet should be forwarded out of, e.g., an egress data port 316(3) of stackable switch 302(3) in order to reach its next hop destination. Stackable switch 302(1) can then send the packet over stacking link 318 to stackable switch 302(3), thereby allowing switch 302(3) to forward the packet out of the appropriate egress data port.

FIG. 4 depicts a chassis system 400, which is another type of MPP networking system. Chassis system 400 includes a management module 402 and a number of I/O modules 410(1)-410(3) that are interconnected via an internal switch fabric 408. Management module 402 includes a management CPU 404 and a SW routing table 406 that are similar to management CPU 102 and SW routing table 104 of router 100 of FIG. 1. In addition, each I/O module 410(1)-410(3) includes a packet processor 412(1)-412(3), a HW routing engine 414(1)-414(3), a HW routing table 416(1)-416(3), and data ports 418(1)-418(3) that are similar to components 106-112 of router 100 of FIG. 1. Generally speaking, I/O modules 410(1)-410(3) can act in concert to carry out various data plane functions, including L3 routing, for chassis system 400. For instance, I/O module 410(1) can receive a packet on an ingress data port 418(1), perform a lookup (via HW routing engine 414(1)) into its local HW routing table 416(1), and determine based on the lookup that the packet should be forwarded out of, e.g., an egress data port 418(2) of I/O module 410(2) in order to reach its next hop destination. I/O module 410(1) can then send the packet over switch fabric 408 to I/O module 410(2), thereby allowing I/O module 410(2) to forward the packet out of the appropriate egress data port.

One inefficiency with performing L3 routing in a MPP networking system like stacking system 300 or chassis system 400 as described above pertains to the way in which the multiple HW routing tables of the system are utilized. In particular, since ingress packets may arrive at any packet processor of the system, the same set of routing entries are replicated in the HW routing table of every packet processor. As a result, the HW routing table capacity of the system is constrained by the size of the smallest HW routing table. For instance, in stacking system 300, assume that HW routing table 312(1) supports 16K entries while HW routing tables 312(2) and 312(3) support 32K entries each. In this scenario, every HW routing table 312(1)-312(3) will be limited to holding a maximum of 16K entries (since additional entries beyond 16K cannot be replicated in table 312(1)). This means that a significant percentage of the system's HW routing resources (e.g., 16K entries in tables 312(2) and 312(3) respectively) will go unused. This also means that the HW routing table capacity of the system cannot scale upward as additional switches are added.

SUMMARY

Techniques for aggregating hardware routing resources in a system of devices are provided. In one embodiment, a device in the system of devices can divide routing entries in a software routing table of the system into a plurality of route subsets. The device can further assign each route subset in the plurality of route subsets to one or more devices in the system. The device can then install, for each route subset that is assigned to the device, routing entries in the route subset into a hardware routing table of the device.

The following detailed description and accompanying drawings provide a better understanding of the nature and advantages of particular embodiments.

DETAILED DESCRIPTION

Figure 1:
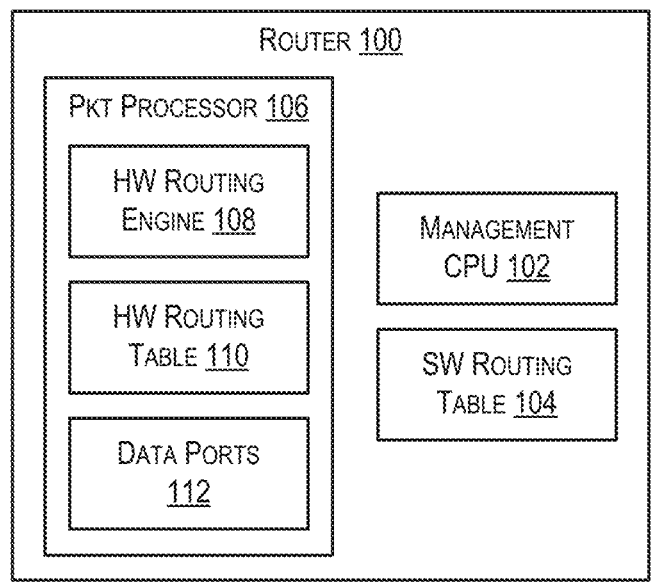
FIG. 1 depicts an exemplary router.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

The present disclosure describes techniques for aggregating HW routing resources in a MPP networking system, such that the system is no longer limited by the capacity of the system's smallest HW routing table. In one set of embodiments, this can be achieved by dividing the routing entries in the system's SW routing table (represented as a routing trie) into a number of route subsets, assigning each route subset to one or more devices/modules in the system, and installing the route subsets that are assigned to a particular device/module in the local HW routing table of that device/module (without installing the other route subsets). In this way, the routing entries in the SW routing table can be effectively split across all of the HW routing tables in the system, rather than being replicated in each one. The system can also install, in the HW routing table of each device/module, one or more special routing entries (referred to herein as "redirection entries") for routes that are assigned to remote devices/modules. These redirection entries can point to the remote device/module as the next hop.

When an ingress packet is received at a particular device/module, the device/module can perform a first L3 lookup to determine whether a routing entry that matches the packet's destination IP address is installed in the device/module's local HW routing table. If a matching routing entry is found, the device/module can cause the packet to be forwarded out of an egress data port of the system based on the entry.

On the other hand, if a matching routing entry is not found in the local HW routing table (which means that the routing entry is installed in the HW routing table of another device/module, referred to as the "remote" device/module), the L3 lookup can match the redirection entry noted above that identifies the remote device/module as the next hop. This, in turn, can cause the device/module to forward the packet to the remote device/module over an intra-system link (e.g., a stacking link in the case of a stacking system, or an internal switch fabric link in the case of a chassis system). Upon receiving the forwarded packet, the remote device/module can perform a second L3 lookup into its HW routing table, which will include a locally installed routing entry matching the destination IP address of the packet. The remote device/module can then forward, based on the locally installed routing entry, the packet out of an appropriate egress data port towards its destination.

Since the SW routing table of the MPP networking system is distributed across (instead of being replicated in) the system's HW routing tables, the approach above allows the system to achieve a total HW routing table capacity that is approximately equal to the sum of the individual HW routing table capacities of its constituent devices/modules. For example, if the MPP networking system comprises three HW routing tables that each support 16K entries, the system can have a total routing table capacity of 16K+16K+16K=48K entries (minus a certain number of entries for redirection). This, in turn, enables the MPP networking system to more efficiently utilize its HW routing resources, as well as scale to support more routes as additional devices/modules (with additional HW routing tables) are added. Generally speaking, the foregoing approach will not adversely affect the system's routing performance in a significant manner since an ingress packet is processed for routing at most twice (e.g., a first time for the L3 lookup at the ingress device/module and a second time for the L3 lookup at the remote device/module, if necessary).

In certain embodiments, the assignments of route subsets to devices/modules can be implemented using a novel ownership model where each route subset is associated with an "owner set" including between zero and N owners (where N is the total number of devices/modules in the system, and where an owner set with zero owners indicates that associated routes should be installed to all devices/modules). As described in further detail below, this ownership model is advantageous because it supports redundancy (i.e., ownership of a routing entry by multiple devices/modules) and simplifies route re-assignments for load balancing purposes.

Figure 4:
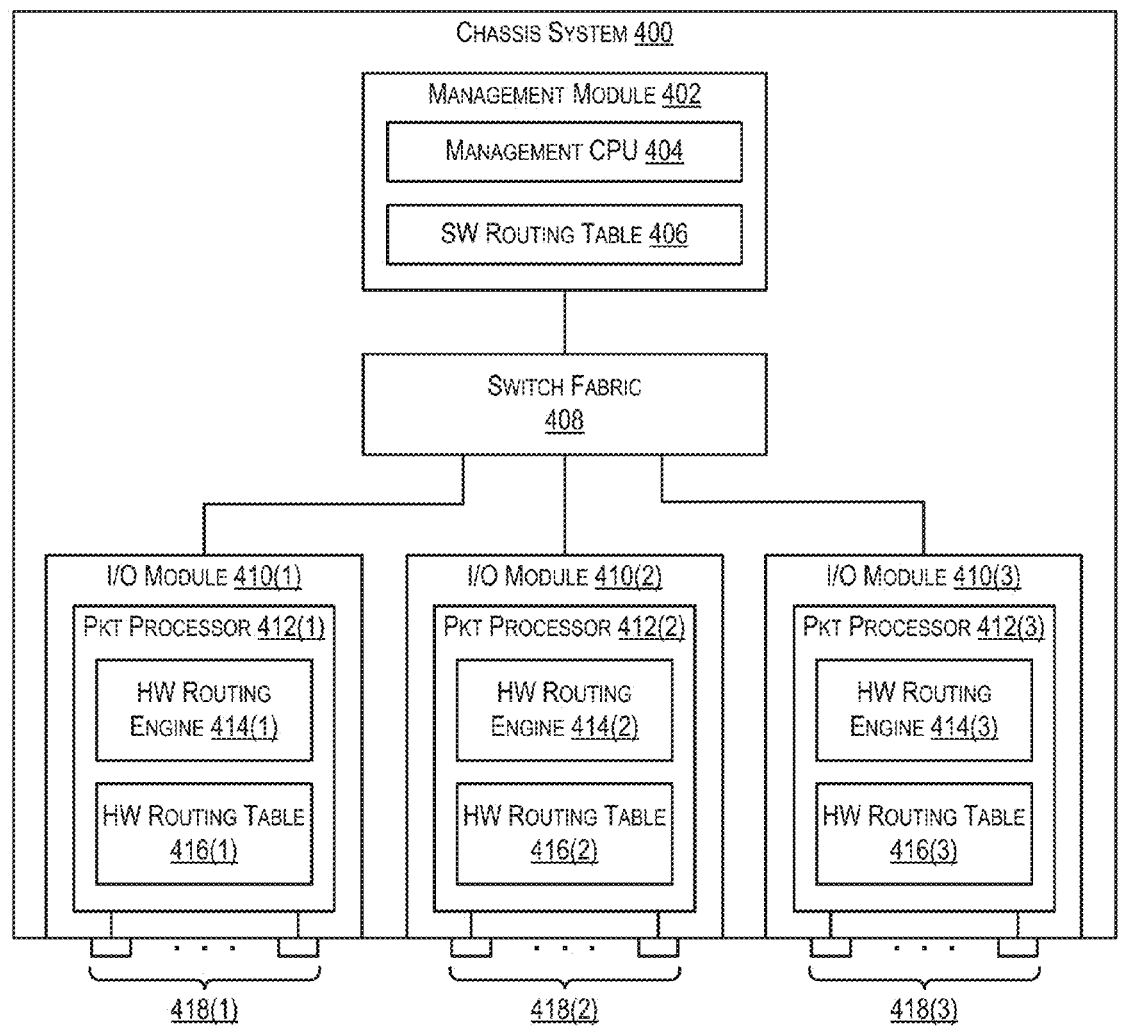
FIG. 4 depicts an exemplary chassis system.

For clarity of explanation, in the sections that follow, several examples and embodiments describe the techniques of the present invention in the context of stacking systems. However, it should be appreciated that these techniques may also be applied to other types of MPP networking systems, such as chassis system 400 of FIG. 4. Accordingly, within the detailed description, references to "stacks" or "stacking systems" can be construed as encompassing generalized MPP systems comprising multiple devices or modules, and references to "switches" or "stackable switches" can be construed as encompassing generalized devices/modules within an MPP system.

2. System Environment

Figure 3:
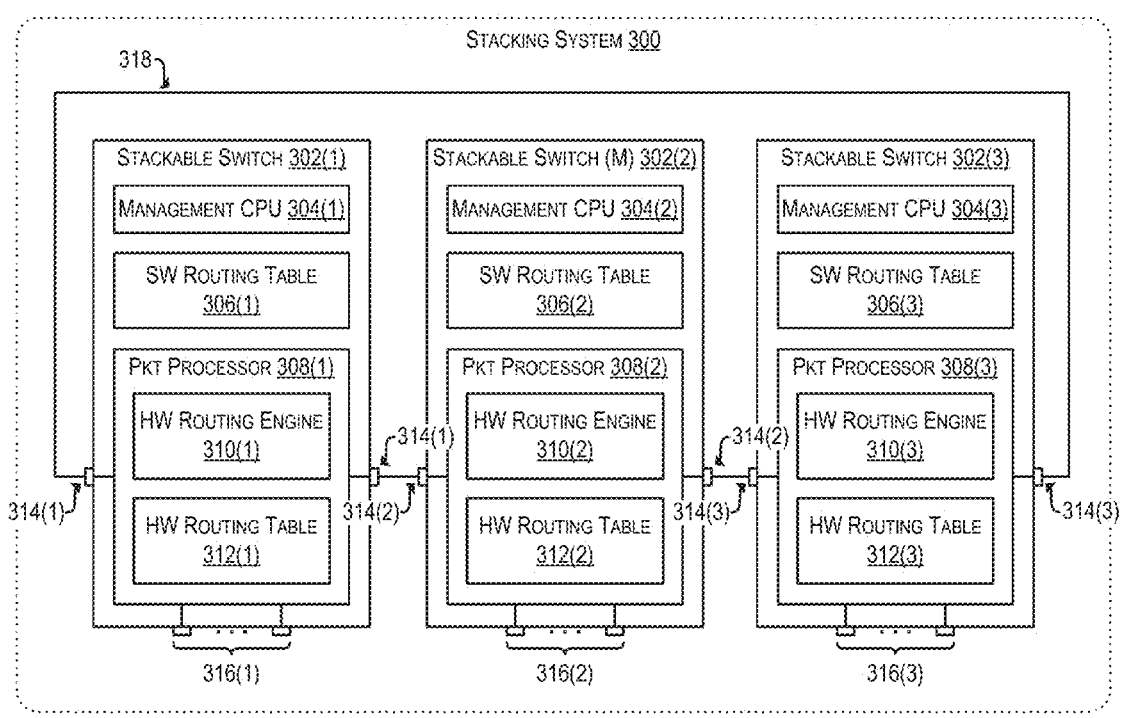
FIG. 3 depicts an exemplary stacking system.
Figure 5:
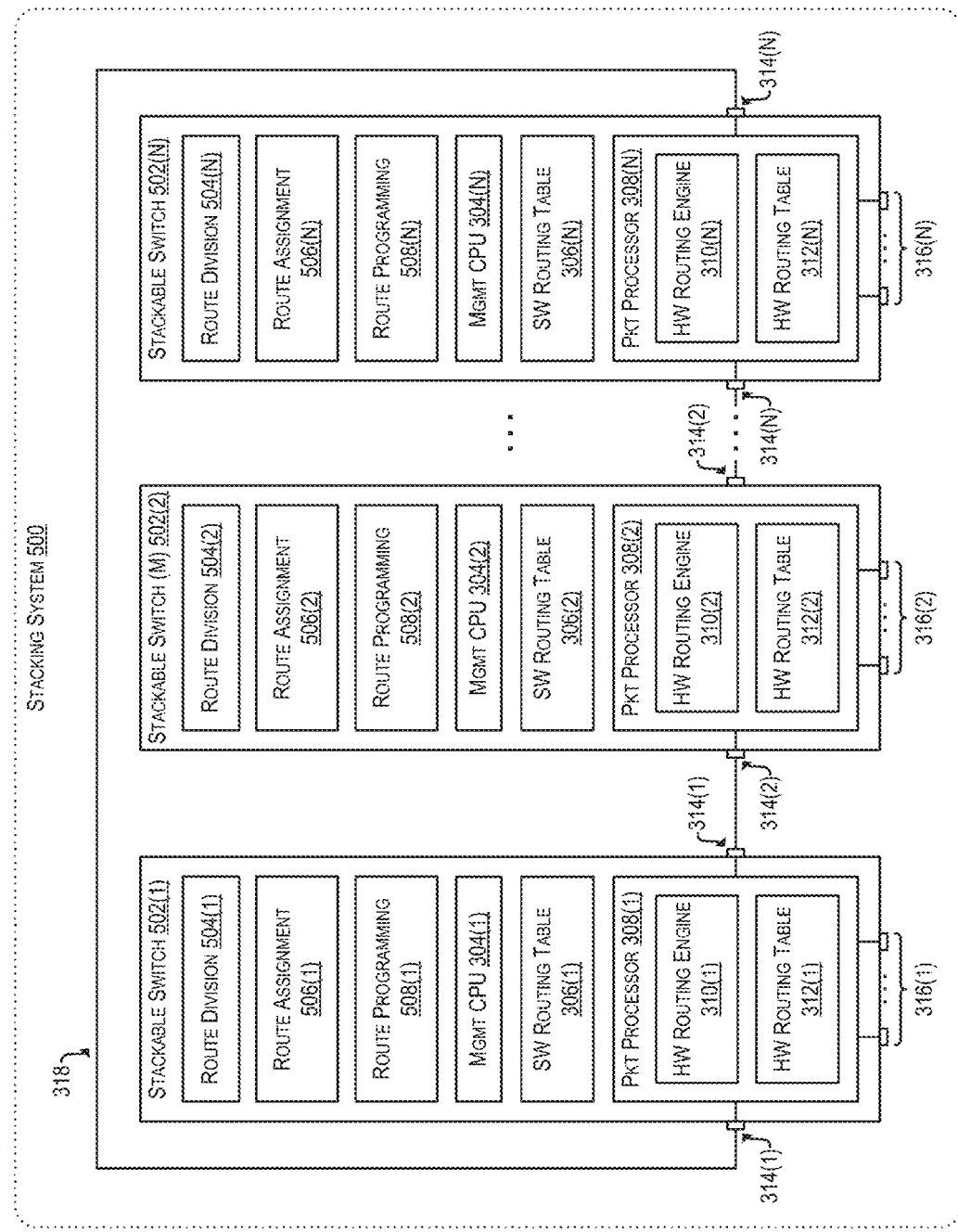
FIG. 5 depicts a stacking system that supports aggregation of HW routing resources according to an embodiment.

FIG. 5 depicts a stacking system 500 that supports HW routing table aggregation according to an embodiment. As shown, stacking system 500 comprises a number of stackable switches 502(1)-502(N), each of which includes certain components that are similar to the components of stackable switches 302(1)-302(3) of FIG. 3 (e.g., management CPU 304(1)-304(N), SW routing table 306(1)-306(N), packet processor 308(1)-308(N), HW routing engine 310(1)-310(N), HW routing table 312(1)-312(N), stacking ports 314(1)-314(N), and data ports 316(1)-316(N)). Although stackable switches 502(1)-502(N) are depicted as forming a ring topology, it should be appreciated that other types of topologies (e.g., linear, star, arbitrary mesh, etc.) are possible.

In the example of FIG. 5, stackable switch 502(2) is designated as the master switch of stacking system 500 (denoted by the letter "M"), which means that switch 502(2) serves as the point of user contact for all management functions of system 500. For instance, master switch 502(2) can accept and process user commands directed to the overall configuration of stacking system 500. Master switch 502(2) can also communicate with the non-master switches of stacking system 500 as needed in order to propagate various types of management commands and data to those switches.

As discussed in the Background section, one inefficiency with performing L3 routing in a MPP networking system like stacking system 500 is that the same routing entries are typically replicated in each HW routing table of the system. This replication means that the HW routing table capacity of the stacking system is limited by the size of the smallest HW routing table, regardless of the size of the other HW routing tables or the total number of HW routing tables in the system.

To address the foregoing and other similar issues, each stackable switch 502(1)-502(N) of FIG. 5 includes a novel route division component 504(1)-504(N), a novel route assignment component 506(1)-506(N), and a novel route programming component 508(1)-508(N) (alternatively, only master switch 502(2) may include these components, which is described below). In one set of embodiments, components 504(1)-504(N), 506(1)-506(N), and 508(1)-508(N) can be implemented as software that is executed by respective management CPUs 304(1)-304(N) and stored in an associated memory (not shown). In other embodiments, one or more of these components can be implemented partially or entirely in hardware.

At a high level, route division components 504(1)-504(N), route assignment components 506(1)-506(N), and route programming components 508(1)-508(N) can work in concert to distribute the routing entries in stacking system 500's SW routing table across HW routing tables 312(1)-312(N), instead of replicating the entries in each HW routing table. For instance, route division components 504(1)-504(N) can first divide the routing entries in the SW routing table into a number of route subsets. Route assignment components 506(1)-506(N) can subsequently assign each of the route subsets to one or more stackable switches 502(1)-502(N), and route programming components 508(1)-508(N) can install the routes in each route subset into the HW routing table(s) of the stackable switch(es) to which the route subset is assigned. As part of this latter step, route programming components 508(1)-508(N) can install "redirection entries" in each HW routing table 312(1)-312(N) for those routing entries that are not installed locally (i.e., are only installed in the HW routing tables of other, "remote" switches in the system). These redirection entries can point to the remote switches as the next hop, thereby allowing the host switch to know where to send packets that match those entries.

Then, at runtime of stacking system 500, HW routing engines 310(1)-310(N) of stackable switches 502(1)-502(N) (which are modified in accordance with embodiments of the present invention) can forward incoming packets in a distributed manner using the routing entries and redirection entries that have been installed in HW routing tables 312(1)-312(N) as mentioned above. For example, if a particular HW routing engine 310(X) finds a matching routing entry (using LPM) for an ingress packet in its local HW routing table 312(X), HW routing engine 310(X) can cause the packet to be forwarded out of an egress data port of stacking system 500 based on the routing entry. However, if a matching redirection entry is found in HW routing table 312(X) using LPM (instead of a matching routing entry), HW routing engine 310(X) can forward, based on the redirection entry, the packet to another stackable switch of stacking system 500 (e.g., "remote" switch 502(Y)) that does have an appropriate routing entry in its HW routing table for the packet. HW routing engine 310(Y) of remote switch 502(Y) can then match the packet against the routing entry in its local HW routing table 312(Y) and forward the packet out of an egress data port towards its destination. In this way, stacking system 500 can correctly route packets that are received at any member switch, without requiring the same routing entries to be replicated in the HW routing table of each switch.

Additional details regarding the operation of route division components 504(1)-504(N), route assignment components 506(1)-506(N), route programming components 508(1)-508(N), and HW routing engines 310(1)-310(N) are presented in the sections that follow.

3. Dividing, Assigning, and Installing Routing Entries

Figure 6:
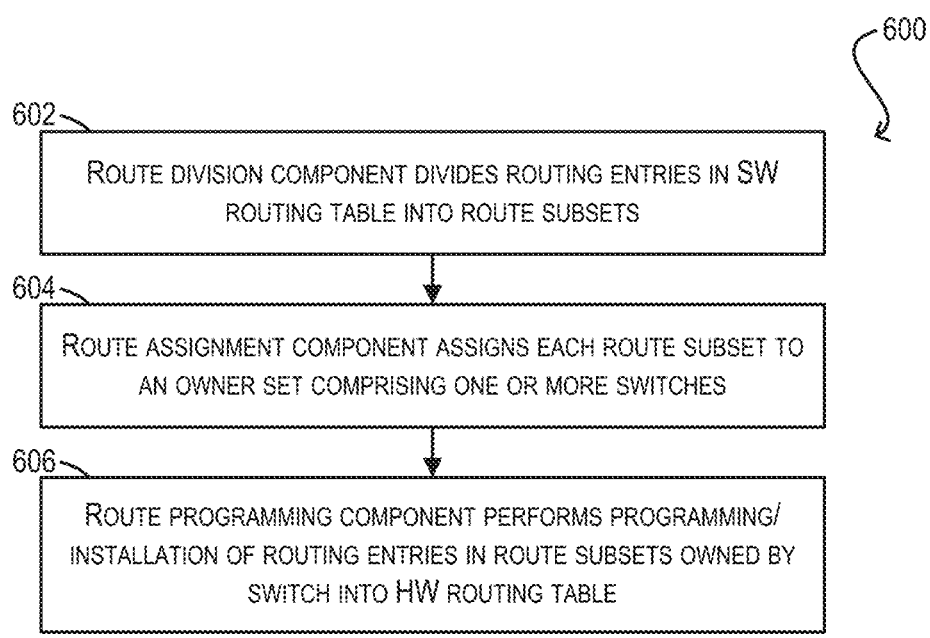
FIG. 6 depicts a flowchart performed by the stacking system of FIG. 5 to distribute routing entries among system members according to an embodiment.

FIG. 6 depicts a high-level flowchart 600 that can be performed by components 504(1)-504(N), 506(1)-506(N), and 508(1)-508(N) of FIG. 5 for distributing the routing entries in stacking system 500's SW routing table among HW routing tables 312(1)-312(N) according to an embodiment. In one set of embodiments, flowchart 600 can be performed during an initialization phase of stacking system 500 before the system begins accepting data traffic for forwarding/routing.

It should be noted that flowchart 600 (and the other flowcharts in the present disclosure) assumes: (1) SW routing tables 306(1)-306(N) of FIG. 5 are synchronized across stackable switches 502(1)-502(N); and (2) the flowchart steps are performed independently by the route division, assignment, and/or programming components of each switch 502(1)-502(N). This is referred to as a "distributed" approach.

In alternative embodiments, the steps of flowchart 600 (and certain other flowcharts described herein) can be performed solely by the route division, assignment, and/or programming components of the master switch in stacking system 500 (i.e., master switch 502(2)). This referred to as a "centralized" approach. With the centralized approach, there is no need for the non-master switches to execute instances of components 506-508; instead, the master switch can determine how to divide, assign, and install routes for each stackable switch in the stacking system, and can simply provide each non-master switch a list of routing entries to be installed in its local HW routing table. This centralized approach also obviates the need for synchronizing the SW routing table across switches—only a single copy of the SW routing table needs to be maintained by the master switch.

Generally speaking, as long as every stackable switch 502(1)-502(N) of stacking system 500 executes the same algorithms, the distributed approach should generate the same results (i.e., the same route installations in HW routing tables 312(1)-312(N)) as the centralized approach.

Turning now to block 602 of FIG. 6, route division component 504(X) of each stackable switch 502(X) can first divide the routing entries in its SW routing table 306(X) into a number of route subsets, where each route subset includes one or more routing entries. As noted in the Background section, in certain embodiments the SW routing table can be represented/maintained as a trie data structure (i.e., a routing trie). Accordingly, in these embodiments, dividing the SW routing table into routing subsets can comprise partitioning the route nodes of the routing trie.

In various embodiments, the number of route subsets created at block 602 is not limited by the number of stackable switches in stacking system 500. For instance, although there are N stackable switches 502(1)-502(N), the SW routing table can be divided into P route subsets, where P is less than, equal to, or greater than N. In a particular embodiment, if there are Q total routing entries in SW routing table 306(X), route division component 504(X) can divide the SW routing table such that each of the P subsets comprises approximately Q/N entries.

At block 604, route assignment component 506(X) can receive the route subsets created by route division component 504(X) and can assign each route subset to an "owner set" comprising zero or more of stackable switches 502(1)-502(N). In this manner, route assignment component 506(X) can determine which subsets should be installed to which switches/HW routing tables of stacking system 500. Generally speaking, the owner sets can be non-exclusive—in other words, two different owner sets (for two different route subsets) can include the same stackable switch, or "owner." Further if an owner set includes zero owners, that indicates the route subset assigned to that owner set can be installed into the HW routing table of every stackable switch in the stacking system.

The ownership model described above allows for very flexible assignment of routes to switches/HW routing tables. For example, this model enables certain important routes (e.g., subnet routes that cover a large range of addresses, or the default route) to be assigned to multiple owners for redundancy and/or performance reasons. In one embodiment, routes with prefix length equal to or less than 8 can be assigned to an empty owner set (and thus be assigned to every stackable switch).

Further, this ownership model allows for relatively simple load balancing, which is typically needed/desired when 1) a stackable switch joins or leaves the stacking system, or 2) a stackable switch begins running out of free space in its HW routing table due to route additions. For instance, when routing entries need to be offloaded from the HW routing table of a particular stackable switch, the owner sets can simply be modified to re-shuffle route subset assignments, rather than re-dividing the SW routing table/trie. This load balancing process is described in further detail in Section 5.3 below.

Once the route subsets have been assigned to owner sets per block 604, route programming component 508(X) of each stackable switch 502(X) can install the routing entries in the route subsets owned by switch 502(X) into its local HW routing table 312(X) (block 606). As part of this step, route programming component 508(X) can also install one or more redirection entries that correspond to routing entries installed on other stackable switches (i.e., remote switches) in stacking system 500. Each of these redirection entries can include, as its next hop address, the identity/address of the remote switch. In this way, stackable switch 502(X) can know where to forward an ingress packet for further routing if it's local HW routing table 312(X) does not include an actual routing entry matching the destination IP address of the packet.

Figure 7:
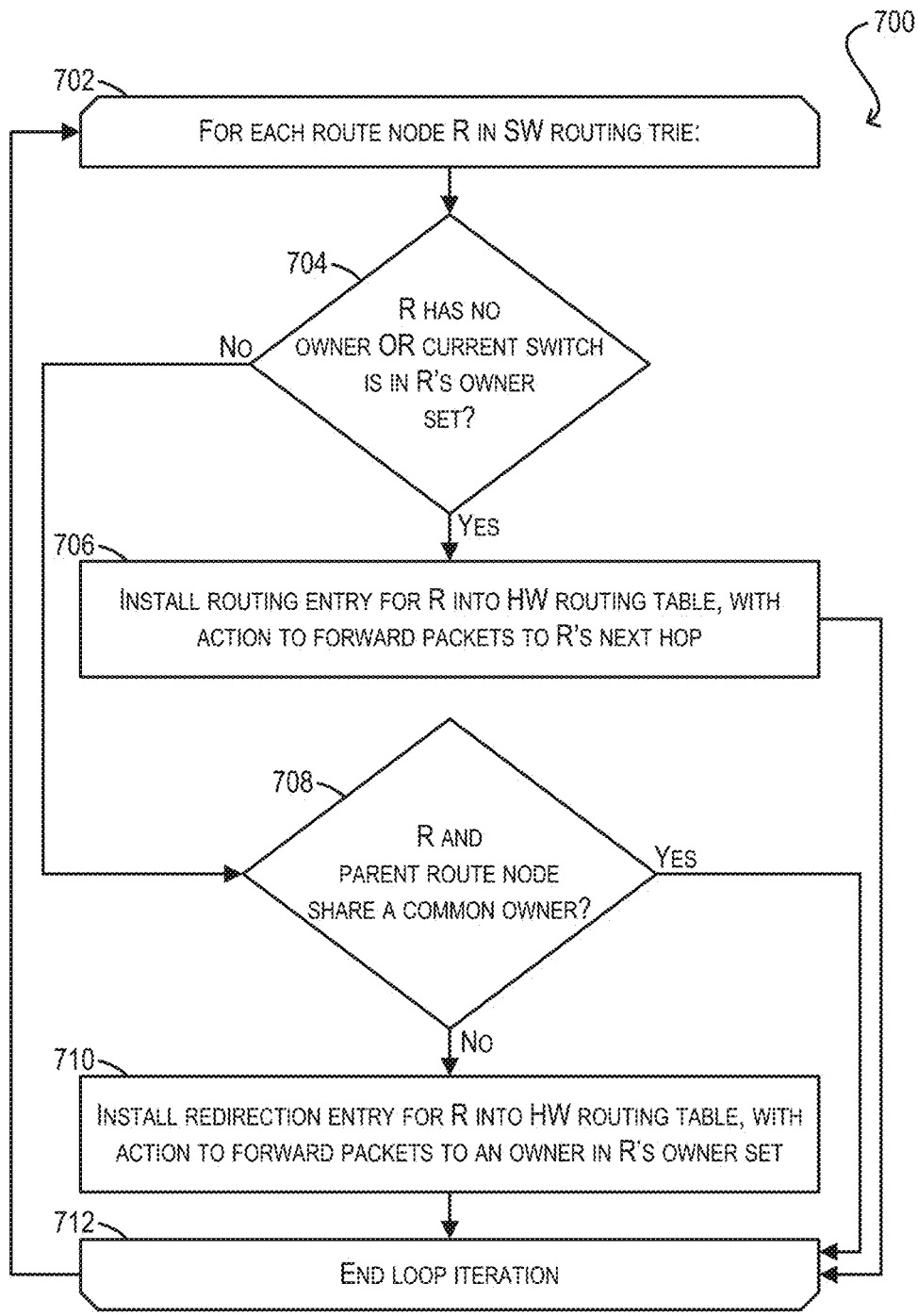
FIG. 7 depicts a flowchart for performing initial HW programming of routing entries according to an embodiment.

To clarify the processing at block 606, FIG. 7 depicts a flowchart 700 that provides additional details regarding how route programming component 508(X) can install routing and redirection entries into HW routing table 312(X) according to an embodiment. Flowchart 700 assumes that HW routing table 312(X) is initially empty, and thus can be carried out during an initialization phase of stacking system 500 (as noted above) or when stackable switch 502(X) newly joins stacking system 500.

At block 702, route programming component 508(X) can enter a loop for each route node R in SW routing table 306(X), which is represented as a routing trie. There are different ways in which loop 702 can be implemented, such via a pre-order (i.e., parent first) or post-order (i.e., children first) traversal of the SW routing trie. The particular traversal method chosen may depend on the hardware design of HW routing table 312(X) (e.g., some TCAMs require a particular traversal order between child and parent nodes).

Within loop 702, route programming component 508(X) can first check if R has no owner (i.e., is assigned to an owner set with zero owners, which means the route is assigned to every stackable switch), or stackable switch 502(X) is in R's owner set. If so, route programming component 508(X) can install a routing entry for R into HW routing table 312(X) with an action to forward packets to R's next hop address (block 706), and can proceed to the end of the loop iteration (block 712).

On the other hand, if the check at block 704 fails, route programming component 508(X) can proceed to check whether R and a parent route node in the SW routing trie share a common owner (block 708). As used herein, the term "parent route node" refers to the closest ancestor node in the SW routing trie that is a route node. This may not be the direct parent node of R in the trie if the direct parent node is a branch node.

If R and the parent route node do share a common owner, that means the HW entry for the parent node will cover the route corresponding to R. As a result, there is no need to install anything into HW routing table 312(X) for R and route programming component 508(X) can proceed to the end of the loop iteration (block 712).

If R and the parent route node do not share a common owner, route programming component 508(X) can install a redirection entry for R into HW routing table 312(X) with an action to forward packets to a stackable switch in R's owner set (block 710). As discussed previously, this redirection entry is different from the routing entry installed at block 706 because the redirection entry will simply cause stackable switch 502(X) to forward, via one or more stacking links, matching packets to the route owner for further L3 processing, rather than out of an egress data port of stacking system 500.

In certain embodiments, route programming component 508(X) may determine at block 710 that R has multiple owners. In this scenario, route programming component 508(X) can select an owner at random for inclusion as the next hop in the redirection entry. Alternatively, route programming component 508(X) can select an owner based on one or more criteria for, e.g., optimization purposes. For example, the criteria can include shortest path (i.e., least hop count), maximum stacking port bandwidth, and/or the like.

Finally, the current loop iteration can end (block 712) and route programming component 508(X) can return to block 702 to process additional route nodes in the SW routing trie (until the entire trie has been traversed).

It should be appreciated that flowchart 700 is illustrative and various modifications/alternative implementations are possible. For instance, in a particular embodiment, flowchart 700 can be modified to reduce the number of entries installed in HW routing table 312(X), thereby achieving "hardware compression." This can involve, e.g., qualifying the routing entry installation performed at block 706 such that, if R's next hop is equal to its parent route node's next hop, the routing entry is not installed (since the parent's routing entry should cover R).

One caveat with the modification above is that, if the next hop of any existing route node in the SW routing trie changes, that route node and all of its direct child route nodes should be examined/adjusted to add or remove routing entries as needed from the appropriate HW routing tables. The definition of "direct child routes" and how to perform this adjustment are discussed in Section 5.1 below.

4. Runtime Packet Forwarding Flow

Figure 8A:
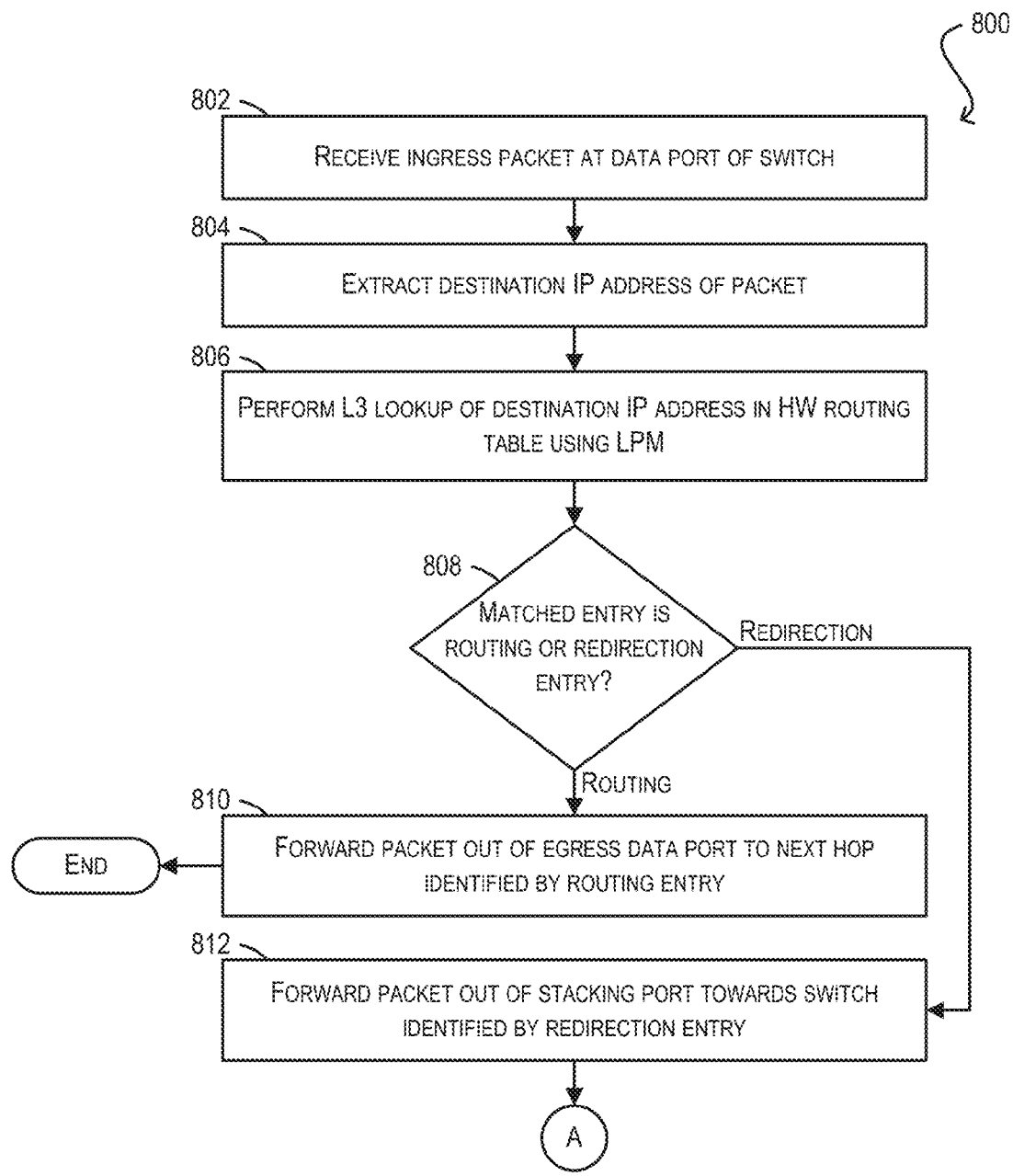
FIGS. 8A and 8B depict a flowchart for forwarding incoming packets according to an embodiment.
Figure 8B:
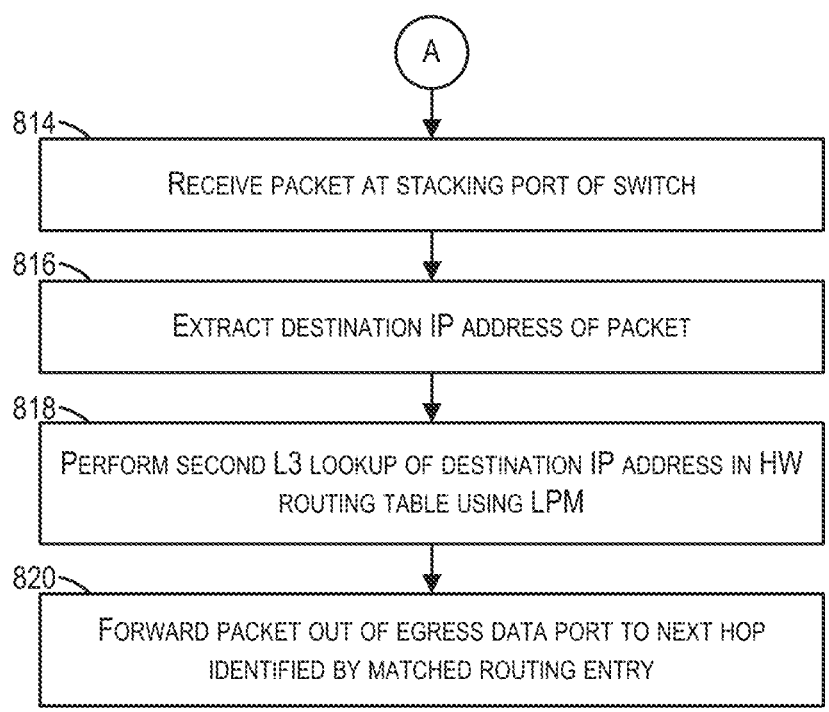

Once the route division, assignment, and programming components of stackable switches 502(1)-502(N) have carried out the processing of FIG. 6, the HW routing engines of the switches can perform L3 routing of incoming packets in a distributed manner based on the HW entries installed at block 606. FIGS. 8A and 8B depict a flowchart 800 can be performed by HW routing engine 310(X) of a particular stackable switch 502(X) (in conjunction with HW routing engine 310(Y) of a remote stackable switch 502(Y)) for routing an ingress packet according to an embodiment.

Starting with block 802 of FIG. 8A, HW routing engine 310(X) can receive an ingress packet at a data port 316(X) of stackable switch 502(X). HW routing engine 310(X) can then extract the destination IP address of the packet (block 804) and perform a L3 lookup of the destination IP address in local HW routing table 312(X) using longest prefix match (LPM) (block 806).

At block 808, HW routing engine 310(X) can determine whether the LPM matched entry in HW routing table 312(X) is a routing entry (i.e., an entry installed per block 706 of FIG. 7) or a redirection entry (i.e., an entry installed per block 710 of FIG. 7). If the LPM matched entry is a routing entry, HW routing engine 310(X) can cause the packet to be forwarded out of an egress data port 316(X) of stackable switch 502(X) (or another stackable switch of stacking system 500) towards a next hop identified by the routing entry (block 810). This forwarding can include, e.g., decrementing a time-to-live (TTL) field of the packet, replacing the destination MAC address of the packet with the next hop's MAC address, and replacing the source MAC address of the packet with the MAC address of stackable switch 502(X). The L3 processing of the packet can then be completed and flowchart 800 can end.

On other hand, if the LPM matched entry at block 808 is a redirection entry, HW routing engine 310(X) can forward the packet out of a stacking port 314(X) of stackable switch 502(X) towards the remote stackable switch identified as the next hop within the redirection entry (e.g., switch 502(Y)) (block 812). Unlike the forwarding at block 810, the forwarding at block 812 typically will not include any modifications to the L2 or L3 headers of the packet. Flowchart 800 can then proceed to FIG. 8B, which is carried out by HW routing engine 310(Y) of remote switch 502(Y).

At blocks 814 and 816 of FIG. 8B, HW routing engine 310(Y) can receive the forwarded packet at a stacking port 314(Y) and can extract the destination IP address of the packet. HW routing engine 310(Y) can then perform a second L3 lookup of the destination IP address in local HW routing table 312(Y) using LPM (block 818). Generally speaking, this second L3 lookup will result in a match with an actual routing entry for the packet, since stackable switch 502(Y) is in the owner set of the route subset comprising the packet's route. In some embodiments, there is a slight chance that the second L3 lookup will not find a matched routing entry due to the timing of the programming the HW routing table (e.g., re-programming during load balancing, etc.); in these cases, HW routing engine 310(Y) can take a default action, such as dropping the packet or trapping it to management CPU 304(Y).

Finally, HW routing engine 310(Y) can cause the packet to be forwarded out of an egress data port 316(Y) of stackable switch 502(Y) towards a next hop identified by the matched routing entry (block 820). The forwarding at block 820 will generally include the same packet modifications described with respect to block 810 of FIG. 8A.

Figure 9:
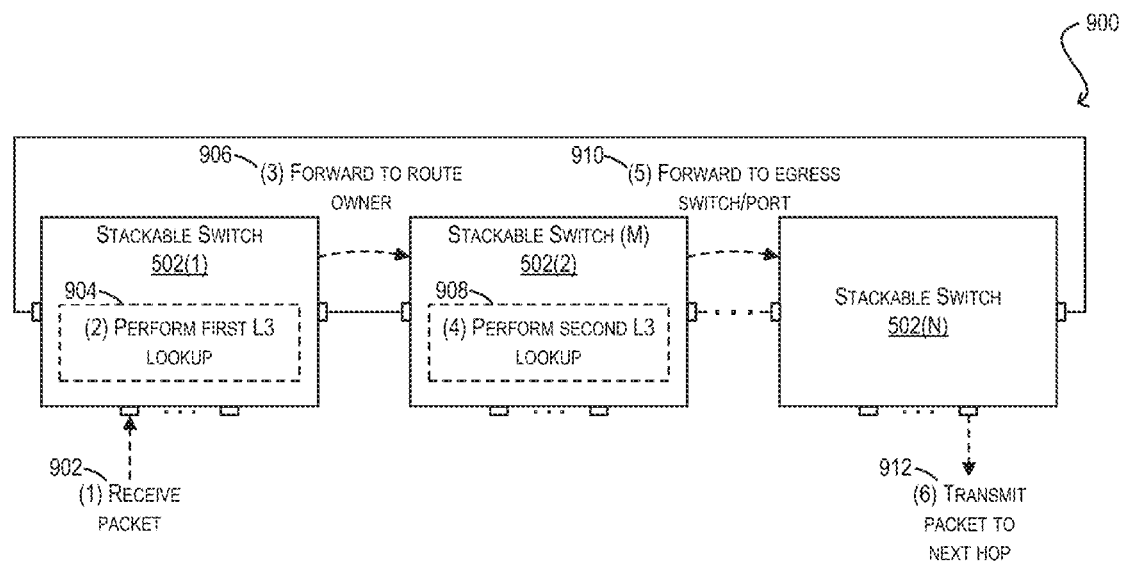
FIG. 9 depicts an example packet flow based on the flowchart of FIGS. 8A and 8B according to an embodiment.

To illustrate the processing of FIGS. 8A and 8B visually, FIG. 9 depicts an example packet flow based on flowchart 800 according to an embodiment. At step (1) of flow 900 (reference numeral 902), stackable switch 502(1) of stacking system 500 receives an ingress packet on a data port. In response, the HW routing engine of stackable switch 502(1) performs a first L3 lookup in its local HW routing table to determine where to forward the packet based on the packet's destination IP address (step (2), reference numeral 904)). As described with respect to FIG. 8A, if the route subset(s) assigned to stackable switch 502(1) included a routing entry covering the packet's destination IP address, stackable switch 502(1) would be able to forward the packet to an appropriate egress switch/port of stacking system 500. However, in the example of FIG. 9, it is assumed that the real routing entry for the packet is installed on stackable switch 502(2) (i.e., the route owner). Thus, as part of step (2), the HW routing engine of stackable switch 502(1) detects a match with a redirection entry that identifies stackable switch 502(2) as the next hop, and forwards the packet to switch 502(2) over a stacking link (step (3), reference numeral 906).

At step (4) (reference numeral 908), the HW routing engine of stackable switch 502(2) receives the forwarded packet and determines (based on, e.g., a special stack tag affixed to the packet) that it needs to perform a second L3 lookup for the packet in its local HW routing table. Based on this second L3 lookup, the HW routing engine of stackable switch 502(2) matches the actual routing entry for the packet's destination IP address and determines the egress switch/port for forwarding the packet out of stacking system 500. Stackable switch 502(2) then forwards the packet over one or more stacking links to the egress switch (in this case, stackable switch 502(N)) (step (5), reference numeral 910), which subsequently sends the packet out of an appropriate egress data port to the next hop destination (step (6), reference numeral 912).

5. Re-Programming the HW Routing Tables

While stacking system 500 is running and performing L3 routing of packets per flowchart 800 of FIGS. 8A and 8B, the routing and redirection entries installed in each HW routing table 312(1)-312(N) may occasionally need to be updated/modified for various reasons. There are generally three scenarios to consider:
 1. Route deletion—A route node is deleted from the SW routing trie
 2. Route addition—A route node is added to the SW routing trie
 3. Load balancing—A stackable switch joins or leaves the stacking system, or a stackable switch runs out of free entries in its HW routing table, necessitating a re-balancing of routing entries across HW routing table Techniques for handling each of these scenarios are described in turn below.

5.1 Route Deletion

Figure 10:
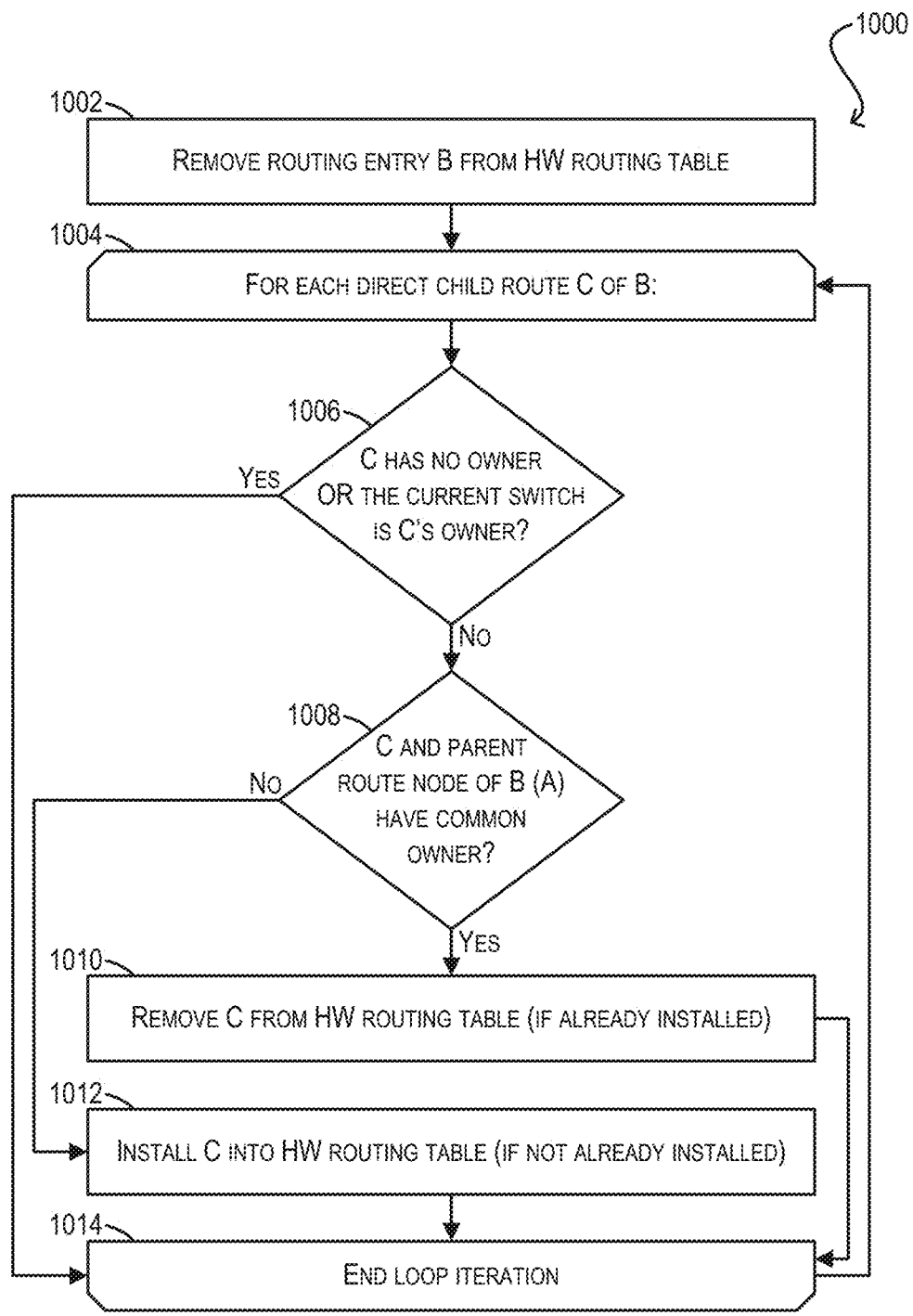
FIG. 10 depicts a flowchart for removing a deleted routing entry from a HW routing table according to an embodiment.

If a route node to be deleted from the SW routing trie is not installed in the HW routing table of any stackable switch in stacking system 500, the route node can be simply removed from the SW routing trie without further processing. However, if the route node is installed in one or more HW routing tables, the installed HW entries should be removed and the direct child routes of the deleted route node should be adjusted in the HW tables. FIG. 10 depicts a flowchart 1000 that can be performed by a route programming component 508(X) for implementing such a removal/adjustment process according to an embodiment. Note that flowchart 1000 only needs to be performed by the stackable switches of stacking system 500 that are owners of the route to be deleted.

Figure 2:
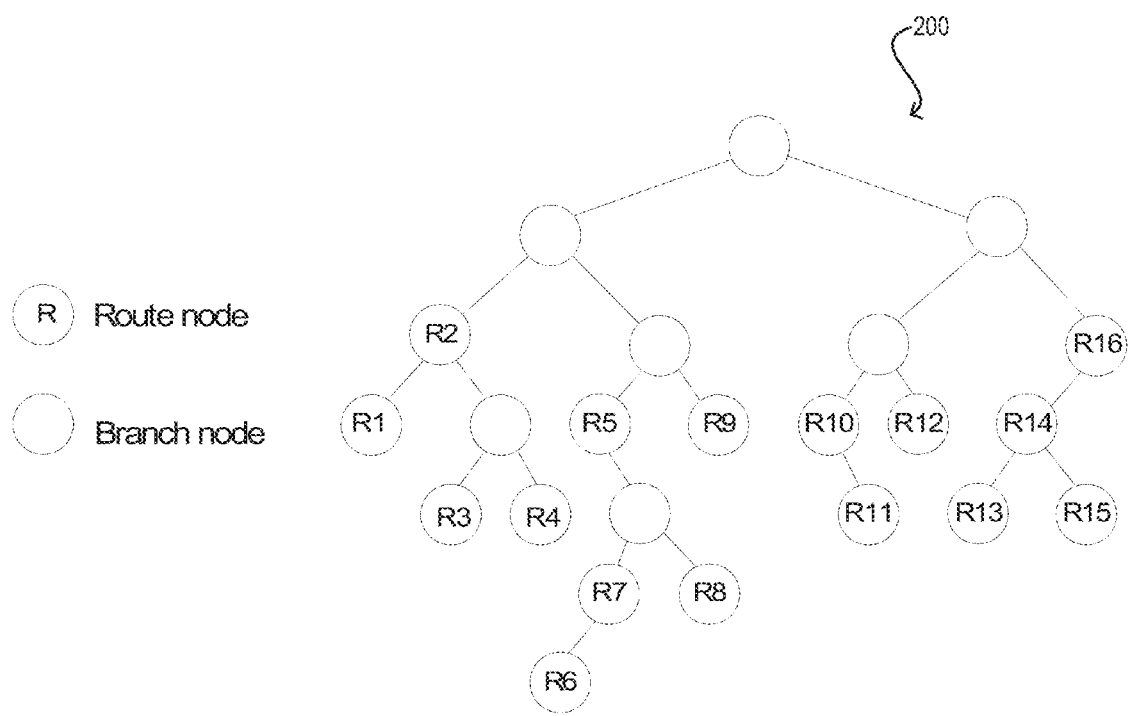
FIG. 2 depicts an exemplary routing trie.

Starting with block 1002, route programming component 508(X) can remove the routing entry to be deleted from the SW routing trie (i.e., entry B) from HW routing table 312(X). Route programming component 508(X) can then enter a loop for each direct child route node (i.e., C) of B in the SW routing trie (block 1004). As used herein, "direct child route" C of a route node B is a route node in the sub-trie of the SW routing trie that is rooted by B, where there are no route nodes between B and C. For example, in routing trie 200 of FIG. 2, R1, R3, and R4 are direct child routes of R2.

In one embodiment, route programming component 508(X) can traverse all of the direct child routes of B via a pre-order traversal of the sub-trie rooted by B. For instance, the following is a pseudo code listing of an exemplary recursive function for performing this pre-order traversal. The "node" input parameter is the root node of the sub-trie to be traversed.

Listing 1

```
Pre_order_to_visit_child_routes(node)
{
    If(node == NIL)
        Return;
    If(node is a branch node)
    {
        Process this node
        Return; // don't go to children anymore
    }
    Else // This is a branch node.
    {
        Pre_order_traverse_a_sub-trie(node's left child node)
        Pre_order_traverse_a_sub-trie(node's right child node)
    }
}
Visit_all_direct_children(node)
{
    Pre_order_traverse_a_sub-trie(node's left child node)
    Pre_order_traverse_a_sub-trie(node's right child node)
}
```

In other embodiments, other types of traversal methods may be used (e.g., post-order, etc.).

Within loop 1004, route programming component 508(X) can first check whether C has no owner or stackable switch 502(X) is C's owner (block 1006). If so, route programming component 508(X) can determine that a routing entry for C is installed in HW routing table 312(X) and that no changes are needed for the installed entry. Accordingly, route programming component 508(X) can proceed to the end of the current loop iteration (block 1014).

If the check at block 1006 fails, route programming component 508(X) can move on to checking whether C and a parent route node of B (i.e., A) share a common owner (block 1008). If so, route programming component 508(X) can remove the routing entry for C from HW routing table 312(X) (if such an entry is already installed), since the HW entry for A will cover C (1010). Route programming component 508(X) can then proceed to the end of the current loop iteration (block 1014).

On the other hand, if route programming component 508(X) determines that C and A do not share a common owner at block 1008, route programming component 508(X) can install a routing entry for C into HW routing table 312(X) (if such an entry is not already installed), since the removed entry for B was previously used to cover C (block 1012). This installation logic is similar to blocks 708 and 710 of FIG. 7 (in the context of block 708 of FIG. 7, the "parent route node" is B's parent route because B is to be removed).

Finally, the current loop iteration can end (block 1014) and route programming component 508(X) can return to block 1004 to process additional direct child routes for B (until all of the direct child routes have been traversed).

It should be appreciated that flowchart 1000 is illustrative and various modifications/alternative implementations are possible. For example, if flowchart 1000 is implemented using the centralized approach discussed previously, the master switch of stacking system 500 can execute flowchart 700 for each stackable switch that has route B installed in HW. In this embodiment, flowchart 700 can be optimized such that the master switch runs it only once (e.g., the algorithm can loop through all stackable switches before block 1006). One of ordinary skill in the art will recognize other modifications, variations, and alternatives.

5.2 Route Addition

Figure 11:
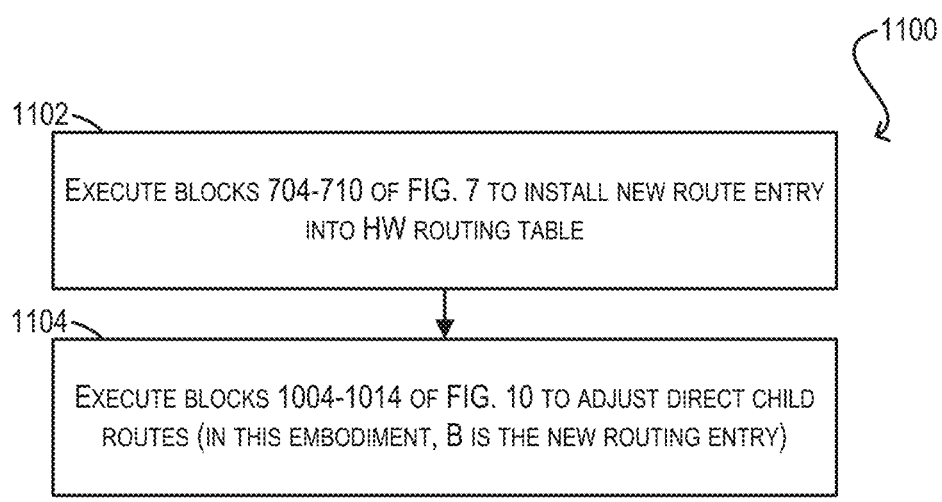
FIG. 11 depicts a flowchart for adding a new routing entry to a HW routing table according to an embodiment.

When a route node is added to the SW routing trie and is assigned to a route subset, the new route should generally be installed into the HW routing tables of the owners of the route subset. FIG. 11 depicts a flowchart 1100 that can be performed by route programming component 508(X) of each owner switch 502(X) for performing this installation according to an embodiment.

At block 1102, route programming component 508(X) can execute blocks 704-710 of FIG. 7 (i.e., the initial programming flow) in order to install the new route into HW routing table 312(X). Then, at block 1104, route programming component 508(X) can execute blocks 1004-1014 of FIG. 10 in order to adjust the direct child routes of the newly added route. In this embodiment, route B of FIG. 10 can correspond to the new route and route C of FIG. 10 can correspond to a direct child route of the new route. Note that for the route addition scenario, block 1008 of FIG. 10 should be modified to read "C and B have a common owner?" rather than "C and parent route node of B (A) have a common owner?," since B is being added rather than deleted.

5.3 Load Balancing

As noted above, load balancing of routes in stacking system 500 is typically needed/desired when 1) a stackable switch joins or leaves system 500, or 2) a stackable switch runs out of free entries in its HW routing table due to route additions. One way to perform this load balancing is to re-partition the SW routing trie into different route subsets. However, this approach is complex and potentially time-consuming (if many HW additions and/or deletions are required).

Figure 12:
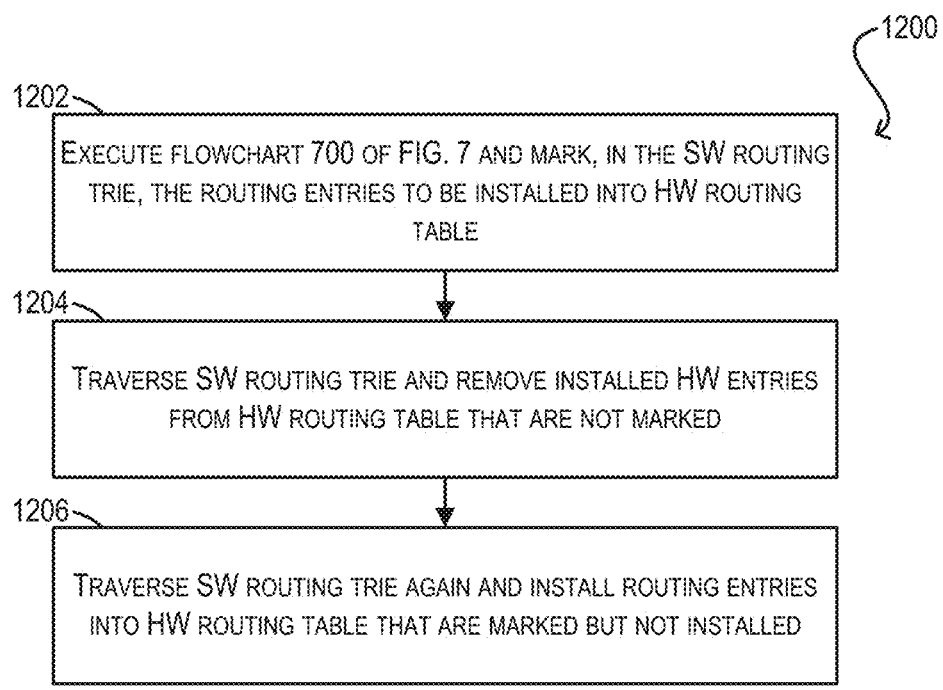
FIG. 12 depicts a flowchart for rebalancing owner sets according to an embodiment.

A better approach, which is enabled by the ownership model discussed in previous sections, is to adjust the owner sets that are associated with the route subsets in order to redistribute route load. For example, assume that the routes of the SW routing trie are divided into P route subsets, where P is larger or smaller than the number of stackable switches in the system (i.e., N). Each route subset corresponds to an owner set, and thus there are P owner sets. In this scenario, the owners in each owner set 1-P can be dynamically added or removed to balance each switch's HW load. Significantly, this load balancing method does not require re-partitioning of the SW routing trie, and thus is simpler and more efficient than the re-partitioning approach. However, in some embodiments, all stackable switches that have changed ownership may need to re-traverse the SW routing trie in order to adjust its HW routing entries. FIG. 12 depicts a flowchart 1200 that can be performed by route programming component 508(X) of each affected switch 502(X) for carrying out this adjustment process according to an embodiment. Flowchart 1200 assumes that the owner sets of the system have already been modified for load balancing purposes.

It should be noted that the simplest approach for carrying out this adjustment process is to remove all of the HW routing entries for each switch that has changed owner sets and re-programming the HW routing tables of those switches via flowchart 700 of FIG. 7. However, this approach can cause traffic disruption since data traffic will still come in during re-programming of the HW routing tables. As a result, it is possible that the HW routing engines will not find matching HW entries for some of the incoming data traffic during the re-programming process.

At block 1202 of flowchart 1200, route programming component 508(X) can execute flowchart 700 of FIG. 7 (i.e., the initial programming flow) and mark, in SW routing table/trie 306(X), the routing entries to be installed in HW routing table 312(X).

At block 1204, route programming component 508(X) can traverse the SW routing trie and remove the installed entries in HW routing table 312(X) that have not been marked per block 1202.

Finally, at block 1206, route programming component 508(X) can traverse the SW routing trie once again and can install routing entries into HW routing table 312(X) that are marked in the SW routing trie but have not yet been installed. In some embodiments, the order of blocks 1204 and 1206 can be reversed depending on different concerns. For example, removing installed entries (per block 1204) before adding new entries (per block 1206) may cause some incoming data traffic to not match any of the entries in the HW routing table. On the other hand, adding new entries before removing installed entries requires a sufficient amount of temporary space in the HW routing table, which may not be available. One way to address both of these concerns it to implement a hybrid approach that can calculate the amount of temporary space required and can determine whether to execute block 1206 before 1204 (or vice versa) based on that space requirement and the space actually available in the table.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
dividing, by a device in a system of devices, routing entries in a software routing table of the system into a plurality of route subsets;
assigning, by the device, each route subset in the plurality of route subsets to one or more devices in the system;
installing, by the device for each route subset in the plurality of route subsets that is assigned to the device, one or more of the routing entries in the route subset into a hardware routing table of the device; and
installing at least one redirection entry into the hardware routing table of the device, wherein the at least one redirection entry corresponds to a routing entry in a route subset that is not assigned to the device, and wherein the at least one redirection entry identifies, as a next hop, another device in the system of devices where the routing entry is installed.

2. The method of claim 1 wherein the route subset that is not assigned to the device is assigned to said another device.

3. The method of claim 1 further comprising:
receiving a data packet at an ingress port of the device;
determining a destination IP address of the data packet;
performing a lookup of the destination IP address in the hardware routing table using a longest prefix match (LPM) algorithm; and
if the LPM algorithm selects a routing entry in the hardware routing table as matching the destination IP address, forwarding the data packet to a next hop identified by the matched routing entry.

4. The method of claim 3 wherein forwarding the data packet to the next hop identified by the matched routing entry comprises:
decrementing a time-to-live (TTL) field of the data packet;
replacing a destination MAC address of the data packet with a MAC address of the next hop;
replacing a source MAC address of the data packet with a MAC address associated with the device or the system; and
sending the data packet out of an egress data port of the device.

5. The method of claim 3 further comprising:
if the LPM algorithm selects the at least one redirection entry as matching the destination IP address, forwarding the data packet to said another device.

6. The method of claim 5 wherein forwarding the data packet to said another device comprises sending the data packet out of a device-to-device port to said another device, without modifying the data packet.

7. The method of claim 5 further comprising, by said another device:
performing a second lookup of the destination IP address in a hardware routing table of said another device; and
forwarding the data packet to another next hop based on the second lookup.

8. The method of claim 1 wherein the software routing table is maintained as a binary trie, and wherein each routing entry in the software routing table is represented as a route node in the binary trie.

9. The method of claim 1 wherein dividing the routing entries of the software routing table into the plurality of route subsets comprises partitioning one or more route nodes of a binary trie.

10. The method of claim 8 wherein installing one or more of the routing entries in the route subset into the hardware routing table of the device comprises, for each route node in the binary trie:
if the route node is part of a route subset that is assigned to the device, installing the routing entry corresponding to the route node into the hardware routing table.

11. The method of claim 10 wherein the routing entry is not installed into the hardware routing table if a next hop for the routing entry is identical to a next hop for parent of the route node in the binary trie.

12. The method of claim 8 wherein installing one or more of the routing entries in the route subset into the hardware routing table of the device comprises, for each route node in the binary trie:
if the route node is not part of a route subset that is assigned to the device, determining whether the route node and a parent of the route node in the binary trie are part of one or more route subsets that are assigned to a common device.

13. The method of claim 8 wherein installing the at least one redirection entry comprises, for each route node in the binary trie:
if the route node and the parent are not part of one or more route subsets that are assigned to a common device, installing a redirection entry into the hardware routing table, the redirection entry including an action to forward packets to a device in the system of devices to which the route node's route subset is assigned.

14. The method of claim 1 further comprising, if a routing entry is deleted from the software routing table:
deleting the routing entry from the hardware routing table of each device where it is installed; and
adjusting one or more direct child routing entries of the deleted routing entry in a hardware routing table of each device where the deleted routing entry was installed.

15. The method of claim 1 wherein assigning each route subset in the plurality of route subsets to one or more devices in the system comprises assigning each route subset to an owner subset in a plurality of owner subsets, the owner subset including the one or more devices.

16. The method of claim 15 wherein at least one route subset is assigned to a first owner subset in the plurality of owner subsets that includes every device in the system of devices.

17. The method of claim 15 further comprising:
determining that the hardware routing table of the device in the system of devices has become full or close to full; and
modifying one or more of the plurality of owner subsets to change the route subsets that are assigned to the device.

18. A non-transitory computer readable medium having stored thereon program code executable by a device in a system of devices, the program code comprising:
code that causes the device to divide routing entries in a software routing table of the system into a plurality of route subsets;
code that causes the device to assign each route subset in the plurality of route subsets to one or more devices in the system;
code that causes the device to install, for each route subset that is assigned to the device, one or more of the routing entries in the route subset into a hardware routing table of the device; and code that causes the device to install at least one redirection entry into the hardware routing table of the device, wherein the at least one redirection entry corresponds to a routing entry in a route subset that is not installed on the device, and wherein the at least one redirection entry identifies, as a next hop, another device in the system of devices where the routing entry is installed.

19. A device for use in a system of devices, the device comprising:

a plurality of device-to-device ports for communicatively coupling the device to one or more other devices in the system;

a plurality of data ports;

a hardware routing table;

a processor; and a non-transitory computer readable medium having stored thereon executable program code which, when executed by the processor, causes the processor to:
divide routing entries in a software routing table of the system into a plurality of route subsets;
assign each route subset in the plurality of route subsets to one or more devices in the system;
install, for each route subset that is assigned to the device, one or more of the routing entries in the route subset into the hardware routing table; and
install at least one redirection entry into the hardware routing table of the device, wherein the at least one redirection entry corresponds to a routing entry in a route subset that is not installed on the device, and wherein the at least one redirection entry identifies, as a next hop, another device in the system of devices where the routing entry is installed.

* * * * *